(12) United States Patent
Ferlitsch

(10) Patent No.: US 7,339,691 B2
(45) Date of Patent: Mar. 4, 2008

(54) SYSTEMS AND METHODS FOR PROVIDING CONTENT FILTERING OF A PRINT JOB

(75) Inventor: Andrew Rodney Ferlitsch, Tigard, OR (US)

(73) Assignee: Sharp Laboratories of America, Inc., Camus, WA (US)

(*) Notice: Subject to any disclaimer, the term of this patent is extended or adjusted under 35 U.S.C. 154(b) by 899 days.

(21) Appl. No.: 10/419,379

(22) Filed: Apr. 21, 2003

(65) Prior Publication Data
US 2004/0207878 A1    Oct. 21, 2004

(51) Int. Cl.
*G06F 15/00* (2006.01)
(52) U.S. Cl. .................. 358/1.15; 358/1.13; 358/1.14; 358/1.18; 358/2.1; 715/513; 715/526
(58) Field of Classification Search .............. 358/1.15, 358/1.14, 1.13, 2.1, 1.18; 715/513, 526
See application file for complete search history.

(56) References Cited

U.S. PATENT DOCUMENTS

2001/0044797 A1    11/2001    Anwar ................. 707/102

2002/0135800 A1*    9/2002    Dutta ................. 358/1.15

FOREIGN PATENT DOCUMENTS

JP    2000253241    12/2002

* cited by examiner

Primary Examiner—Douglas Q. Tran
Assistant Examiner—Chan S. Park
(74) Attorney, Agent, or Firm—Michael F. Krieger; Kirton & McConkie

(57) ABSTRACT

Systems and methods for using a print subsystem to implement an analysis of the content of a print job prior to despooling the print job to a printing device, and selectively rendering, providing a modified rendering or terminating the print job. A computer device is connected to a printing device to selectively render a print job and includes a print subsystem, such as spooler and optionally a printer driver and a print processor. A further implementation includes a print server having a print subsystem. Print data corresponding to a print job is provided from the print subsystem input processing to a content filtering process to analyze the content thereof prior to despooling the print job to the printing device. The analysis determines if some or all of the content should be rejected, removed, replaced or require acknowledgement.

26 Claims, 6 Drawing Sheets

SYSTEMS AND METHODS FOR PROVIDING CONTENT FILTERING OF A PRINT JOB

BACKGROUND OF THE INVENTION

1. Field of the Invention

The present invention relates to filtering electronic content. In particular, the present invention relates to systems and methods for using a print subsystem to implement an analysis of the content of a print job prior to despooling the print job to a printing device, and selectively rendering, providing a modified rendering or terminating the print job.

2. Background and Related Art

The filtering of electronic content has proven to be beneficial for families and businesses. Today, content filtering of electronic data is utilized in both electronic mail systems and web browsers to eliminate unwanted and/or inappropriate content. For example, in corporate environments it is common for email messages to be automatically analyzed at the corporate email server for inappropriate content (e.g., pornography, gambling, trade secrets, etc.) prior to a delivery of the message to the end user. Typically, the analysis is limited to keyword searching. In one technique, a message is flagged when a keyword is discovered within the message and is manually analyzed by an administrator to determine the appropriateness of the message.

In another technique, the email analysis is performed by an Internet Service Provider (ISP), where each email message is searched for keywords that can be executed as JavaScript. Currently, senders of email correspondence have used keywords to cause actions to occur on the receiver's computer if the receiver is running JavaScript. The technique replaces the JavaScript keywords with semantically equivalent keywords that do not change the meaning of the message.

In another technique, attachments of email messages are analyzed for any executing code that is known to be a virus. When detected, the messages are rejected to prevent delivery to the receiver. The Norton® AntiVirus software is an example of such a technique.

Other techniques relate to filtering content of web pages. For example, one such technique is especially tuned to analysis of electronic images and/or text, using neural network technologies. The neural networks are trained by input examples/non-examples to recognize such things as flesh tones of nude images. This technique utilizes a proxy server. When the user makes a request for a web page, the request is sent to a proxy server, which then pulls the page from the source site. Prior to forwarding the web page contents to the user, software running on the proxy server analyzes the content of the web page. If the content is clean or otherwise appropriate, the web page is forwarded to the user. If the content is flagged as possibly inappropriate, the user is notified and the page is not sent. The system can be configured so that the user can override the page not being sent by manually invoking a send anyways button when the user is notified that the content was flagged. In this case, the web page is forwarded to the user and a copy of the page or URL is logged.

Thus, while techniques currently exist that are used to filter electronic content, challenges still exist in ensuring that inappropriate content is not being rendered. And, while improvements in blocking inappropriate content are continually being developed, the techniques are only available for use in association with filtering electronic content in communicating systems (e.g., email systems and web browsers) used between users and/or sites. Accordingly, it would be an improvement in the art to augment or even replace current techniques with other techniques to restrict and/or eliminate inappropriate content.

SUMMARY OF THE INVENTION

The present invention relates to filtering electronic content. In particular, the present invention relates to systems and methods for using a print subsystem to implement an analysis of the content of a print job prior to despooling the print job to a printing device, and selectively rendering, providing a modified rendering or terminating the print job.

Implementation of the present invention takes place in association with one or more print jobs initiated for rendering within a printing environment. In at least one implementation, a computer device is connected to a printing device to render a print job and includes a print subsystem, such as spooler and optionally a print driver and a print processor. A further implementation includes a print server having a print subsystem.

Print data corresponding to print jobs is provided from the print subsystem input processing to a content filtering process to analyze the content of all print jobs prior to despooling the print jobs to a printing device. The analysis determines if some or all of the content should be rejected, removed, replaced or require acknowledgement.

The filtering of electronic content corresponding to a print job is obtained by analysis of the print job from the print subsystem prior to the job arriving at the printing device (e.g., printer, fax machine, multi-functional peripheral device, etc.) for printing or other rendering, including faxing, scanning, document management, etc. The content filtering process is implemented within the existing print subsystem (e.g., by a print processor, spooler or print assist), is independent of the process for rendering the print job (e.g., can be used in association with existing printer drivers), is independent of the process for transmitting the print job to the destination device(s) (e.g. can be used with existing print providers, including local, network and remote print providers), filters, modifies, requires acknowledgement, and/or rejects a print job before despooling the print/rendering data of the print/rendering job to the printing/rendering device and/or print server, and collects information on the presumed/intended destination of the print/rendering job.

Implementation of the content filtering may be performed at the source origination. For example, the content filtering may occur at or local to a computer device locally coupled to a printing device. Alternatively, the content filtering may occur at a client computer device, wherein the print data is analyzed prior to sending the print job over a network, such as to a print server or in a peer-peer environment directly to a printing device. Alternatively, the content filtering may be performed at another location, such as at the print server, wherein the content filtering is enforced by centralized management of the print jobs prior to despooling the print job to a printing device.

In at least some implementations of the present invention, the content filtering information is collected prior to raster image processing (RIP). Accordingly, the content information, imaging and job information can be analyzed.

Implementation of the present invention embrace content filtering a print job at source origination and intermediate devices in a manner that allows the source/intermediate origination, content information, imaging and/or job information to be analyzed for inappropriate content. In at least some implementations, the content or other information is rejected, removed, replaced or may require acknowledgement prior to rendering the print job. Moreover, implementations can function in pre-existing print subsystems, such as within the Microsoft Windows® family of operating systems.

While the methods and processes of the present invention have proven to be particularly useful in the area of providing a secured print (content filtering and/or a replacement of text and/or images in a print job to a printing or multi-functional peripheral device from a client, server or other remote source), those skilled in the art can appreciate that the methods and processes can be used in a variety of different applications to locate a inappropriate or undesirable information, such as trade secrets, actions not related to the print job itself that could be considered as viruses, or other types of undesirable information. Further, while the methods and processes of the present invention have proven to be particularly useful in the area of printing, those skilled in the art will appreciate that the methods and processes can be used in a variety of different rendering applications, including faxing, scanning, document management, etc.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to filtering electronic content. In particular, the present invention relates to systems and methods for using a print subsystem to implement an analysis of the content of a print job prior to despooling the print job to a printing device, and selectively rendering, providing a modified rendering or terminating the print job.

In the disclosure and in the claims the terms "electronic content" or "content" shall refer to any electronic information or data corresponding to or otherwise relating to a print job. Examples of such content include text, images, executable instructions, or any other information associated with a print job.

The following disclosure of the present invention is grouped into two subheadings, namely "Exemplary Operating Environment" and "Providing Print Job Content Filtering." The utilization of the subheadings is for convenience of the reader only and is not to be construed as limiting in any sense.

Exemplary Operating Environment

Figure 1:
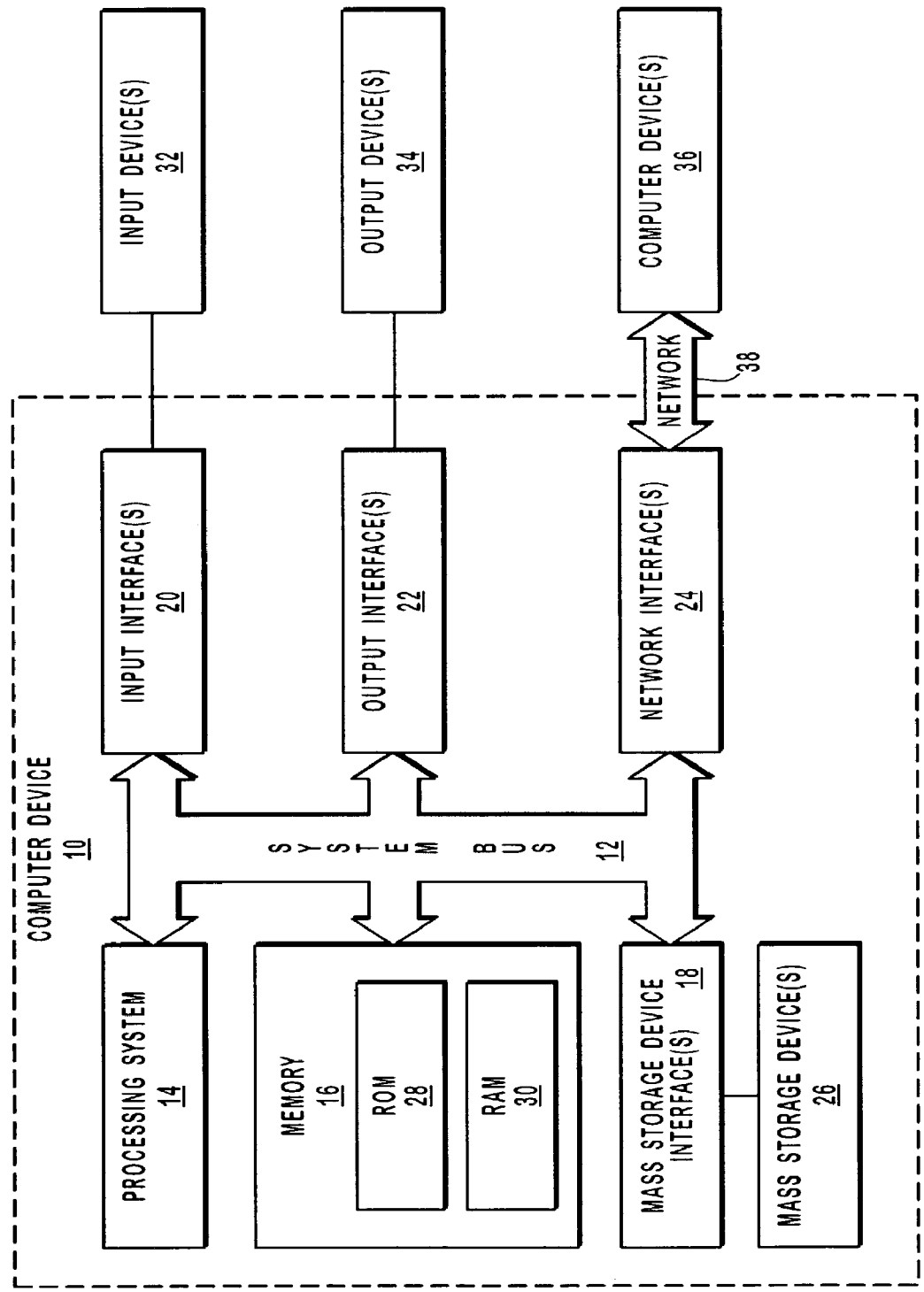
FIG. 1 illustrates a representative system that provides a suitable operating environment for use of the present invention.

FIG. 1 and the corresponding discussion are intended to provide a general description of a suitable operating environment in which the invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
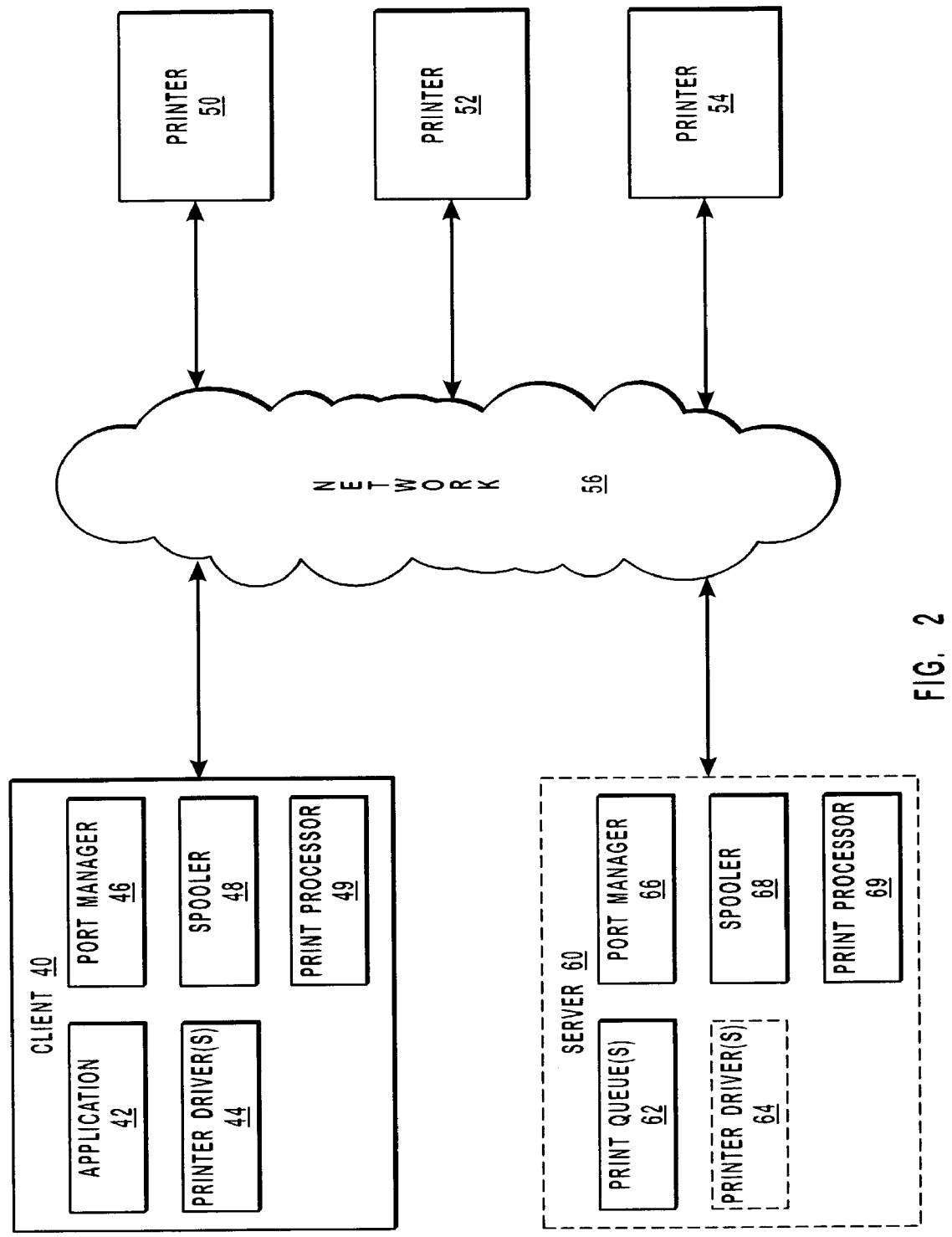
FIG. 2 illustrates a representative networked system configuration.

While those skilled in the art will appreciate that embodiments of the present invention may be practiced in a variety of different environments with many types of computer system configurations, FIG. 2 provides a representative networked system configuration that may be used in association with the present invention. While FIG. 2 illustrates an embodiment that includes a client, three printers, and optionally a print server connected to a network, alternative embodiments include more than one client, less than three printers, more than three printers, no server, and/or more than one server connected to a network. Other embodiments of the present invention include local, networked, or peer-peer printing environments where one or more computer devices are connected to one or more printing devices. Moreover, embodiments in accordance with the present invention also include wireless networked environments, or where the network is a wide area network, such as the Internet.

The representative system of FIG. 2 includes a computer device, illustrated as client 40, which is connected to a plurality of printing devices (printers 50-54) across network 56. In FIG. 2, printers 50-54 may be any type of device that may be used to render a print job. Examples of such devices included printers, fax machines, multi-functional peripheral (MFP) devices, or other types of printing devices. In one embodiment, the capabilities of any one of the printers are heterogeneous to the capabilities of any other printer (e.g., at least one of the capabilities of one printing device, such as printer 50, are different from the capabilities of another printing device, such as printer 52). In another embodiment, the capabilities of the printers are homogeneous.

While printers 50-54 are connected to network 56, embodiments of the present invention embrace the use of printing devices that are locally connected to a computer device, that are configured in a peer-to-peer printing environment, or that are configured in a wireless network environment. Further, the printing devices may be one or more multi-function peripherals (MFPs), facsimile devices, scanning devices, electronic whiteboards, etc.

In the illustrated embodiment, client 40 includes a software application 42, one or more print drivers 44, a port manager 46, a spooler 48, and a print processor 49. A printer server 60 is optionally included having, for example, one or more print queues 62, one or more printer drivers 64, a port manager 66, a spooler 68, and a print processor 69.

Thus, in accordance with the illustrated embodiment and other embodiments of the present invention, an electronic content filtering process is provided and used in a printing environment to enable undesirable or inappropriate content relating to a print job to be filtered, modified, rejected or otherwise checked prior to rendering the print job, as will be further explained below.

Providing Print Job Content Filtering

The present invention relates to filtering electronic content. In particular, the present invention relates to systems and methods for using a print subsystem to implement an analysis of the content of a print job prior to despooling the print job to a printing device, and selectively rendering, providing a modified rendering or terminating the print job.

In at least some embodiments, the process of filtering content of a print job is independent from the processes of initiating a print job and transmitting the print job to a printing device. By way of example, the content filtering process may include a keyword search on plain text and/or text that has undergone a process of optical character recognition (OCR) from images, a grammatical analysis process, a translation to another language prior to analysis and image analysis (e.g., a process by neural networks), or another process.

Further, in accordance with some embodiments, the content filtering process may be internal to the source origination, external to the source origination but centralized in the organization (e.g., server), or external to the organization (e.g., service). Moreover, in some embodiments, the content filtering processes are configurable, controlling what or when content is filtered.

Figure 3:
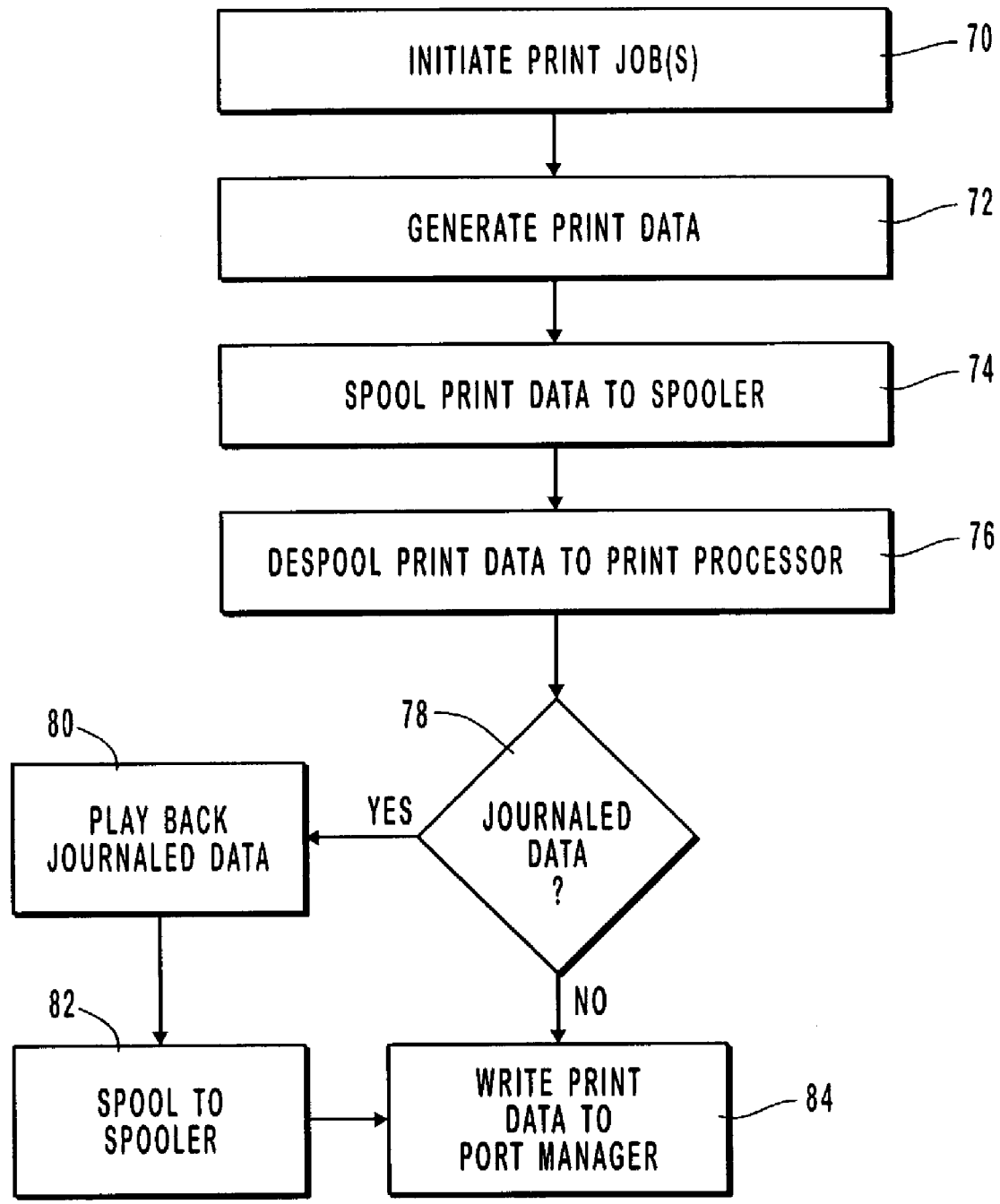
FIG. 3 illustrates representative processing of a print subsystem.

With reference now to FIG. 3, representative processing of a print subsystem is illustrated. In FIG. 3, execution begins at step 70, where one or more print jobs are initiated, such as by a user or by an application. At step 72, a printer driver that is associated with the printing device(s) generates print data. In one embodiment, the application converts the corresponding document(s) of the print job into printing instructions, such as is commonly known as Graphics Device Interface (GDI) for the Microsoft Windows® family of operating systems. The printing instructions are then passed to a printer driver installed on the client and/or server associated with the printing device that converts the printing instructions into a printer dependent format, such as a raster image or PDL. In other embodiments, such as in direct printing, the printer directly interprets the document format and there is no preprocessing of the document format into a printer dependent format.

At step 74, the printer driver spools the print data to a spooler for immediate or later despooling. At step 76, the spooler despools the print data to a print processor. A decision is then made at decision block 78 as to whether or not the print data is journaled data. If the print data is journaled data, execution proceeds to step 80, where the print processor plays back the journaled data to the printer driver to render into printer data. At step 82, the printer driver spools the printer ready data to the spooler. At step 84, the spooler writes the printer ready data directly to port manager(s) of the associated printer(s). Alternatively, if it is determined at decision block 78 that the print data is not journaled data, the print data is rendered data (either raster or PDL) and execution proceeds directly to step 84, where the print processor writes the print data directly to the port manager(s) of the associated printer(s). In a further embodiment, the PDL path is used for journaled data (e.g. EMF), which may be treated as another print language.

Some embodiments of the present invention embrace independent content filtering processes corresponding to one or more components of a print subsystem. Reference is first made to embodiments that embrace print processor based content filtering of a print job. As illustrated in FIG. 3, the print job initiated at step 70 is spooled to a spooler at step 74. The spooler despools the print job to a print processor associated with the selected printing device(s) at step 76. If the print job is rendered data, the print processor despools the print job to the port manager(s) associated with the printing device(s). Alternatively, if the print job is journaled, the print data is played back to the printer driver associated with the installed printer and then written to the port manager(s). In other embodiments, the print processor may despool journaled data to a print server, wherein the spooler/print processor on the print server performs the process detailed above.

During the despooling process, the print processor initiates content filtering with a content filtering process on the print job. The content filtering process may be contained within the print processor, external to the print processor but internal to the computing device, or external to the computing device. Further, in accordance with embodiments of the present invention, the content filtering print processor may be on a client computer device and/or server in a network printing environment.

The content filtering process instructs or performs on behalf of the print processor to (i) reject a print job (e.g., cancel job without printing); (ii) require acknowledgement from a user to print the job; (iii) remove content from the print job; (iv) replace content in the print job; and/or (v) log the actions taken.

Reference is next made to embodiments that embrace spooler based content filtering of a print job, wherein the content filtering functions described herein are preformed by a print spooler. The spooler initiates content filtering with a content filtering process on the print job, wherein the content filtering process may be contained within the spooler, external to the spooler but internal to the computing device, or external to the computing device, and performs the actions described herein.

Embodiments that embrace spooler based content filtering has the advantage of working with a print subsystem where the spooler despools a print job directly to the printing device, without the use of a print processor.

Reference is now made to embodiments that embrace print assist based content filtering of a print job, wherein the content filtering functions described herein are performed by a print assist. A print assist is any component added to the print subsystem between the print source origination (e.g., printer driver) and the port manager. Embodiments that embrace print assist based content filtering have the advantage of integrating into an existing print subsystem without the replacement of any existing components, such as a spooler or print processor.

Reference is now made to embodiments that embrace port manager based content filtering of a print job, wherein the content filtering functions described herein are performed by a port manager. Embodiments that embrace port manager based content filtering have the advantage of integrating into an existing print subsystem without any change to a spooler or print processor.

Thus, in accordance with embodiments of the present invention, the content filtering of a print job may be based on a print processor, a spooler, a print assist or a port manager. The content filtering includes text and/or image segmentation and parsing, text and/or image analysis and filter/action lookup, and various content filtering actions, each of which will be discussed below.

Figure 4:
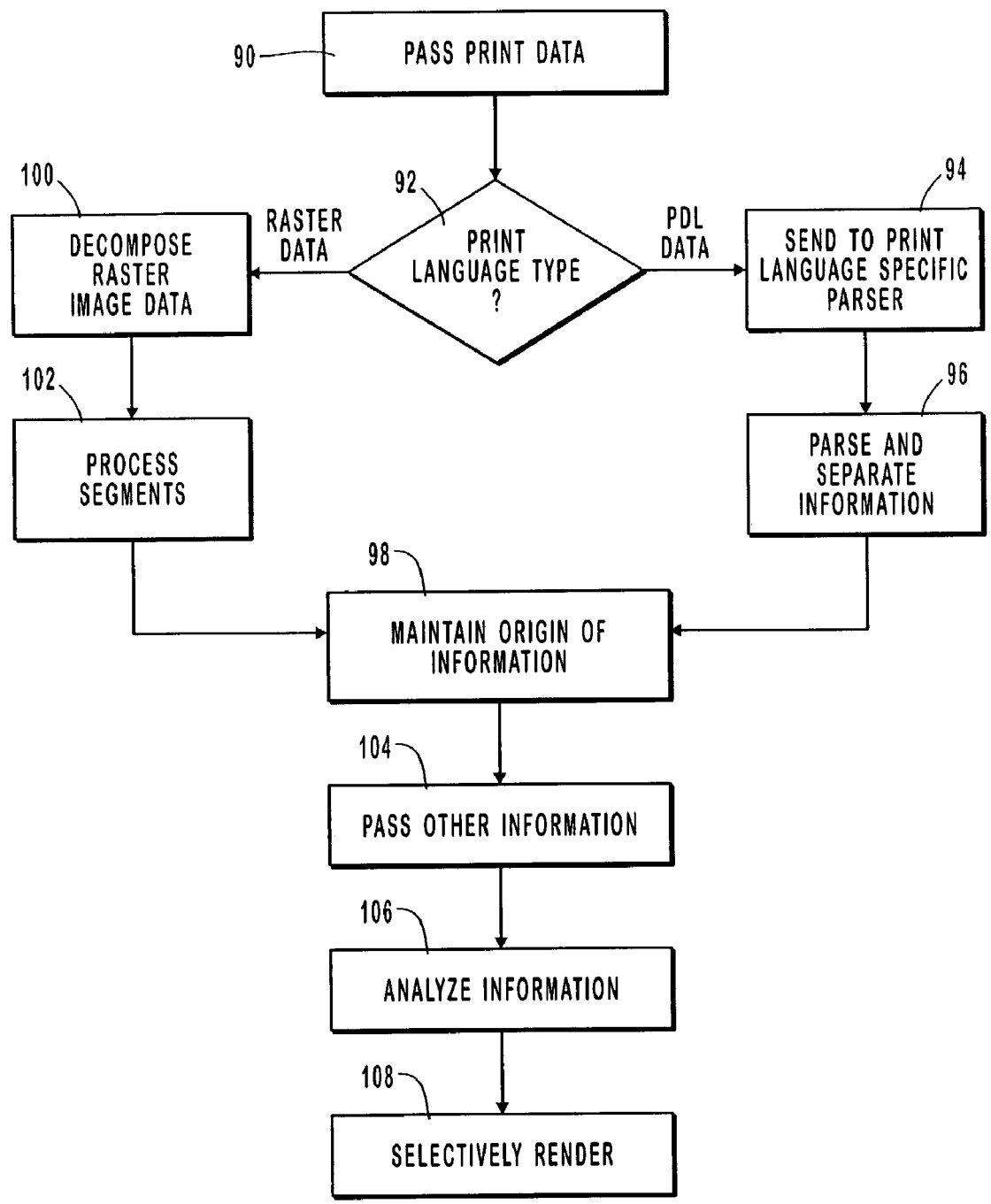
FIG. 4 illustrates representative processing relating to content filtering and analysis.

With reference now to FIG. 4 and in relation to text and/or image segmentation and parsing, the print subsystem's (e.g., spooler, print processor, print assist, etc.) input processing component passes the print data to a content filtering process at step 90. A decision is then made at decision block 92 as to whether the print language type is raster data or PDL data. If it is determined that the print language data is PDL data, execution proceeds to step 94, where the print data is sent to a print language specific parser. In some embodiments, the print data includes multiple segments of different print languages, wherein each segment is sent to its printer language specific parser. At step 96, the PDL parser parses and separates the content information into text and images. In one embodiment, the PDL parser parses text into individual words, phrases, segments or any other grammatical context, without limitation. Execution then proceeds to step 98, wherein information about the location in the print data from where the text/image segment originates is maintained.

Returning back to decision block 92, if it is determined that the print language type is raster data, the print data is directed to a raster image segmentation process. At step 100, the segmentation process decomposes the raster image data into regions of text and image only (e.g., photographs) data. At step 102, segments containing text are processed by optical character recognition (OCR) into text. In one embodiment, the text segmentation process parses text into individual words, phrases, segments or any other grammatical context, without limitation. Execution then proceeds to step 98, wherein information about the location in the print data from where the text/image segment originates is maintained.

After step 98, execution then proceeds to step 104, where other context information may also be passed, such as job destination information or previous content (e.g., related text). A content analysis is performed at step 106, which relates to a process of text and/or image analysis and filter/action lookup. The print job is then selectively rendered at step 108, which includes selectively (i) rejecting the print job (e.g., cancel job without printing); (ii) requiring acknowledgement from a user to print the job; (iii) removing content from the print job; (iv) replacing content in the print job; and/or (v) logging the actions taken. Steps 106 and 108 are more fully described below in relation to FIGS. 5-6.

Figure 5:
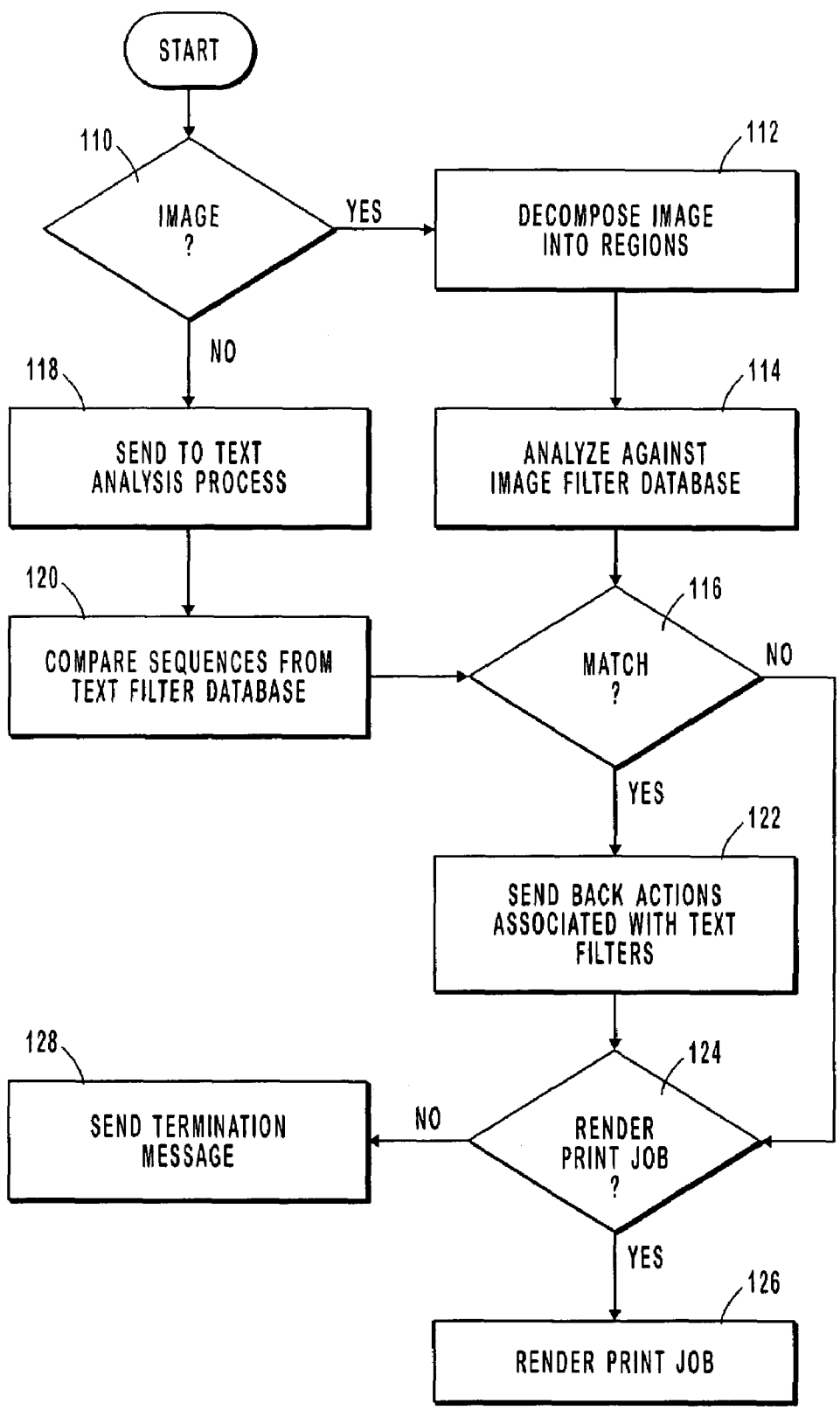
FIG. 5 illustrates additional processing relating to content filtering and analysis.

With reference first to FIG. 5, and in relation to processes of text and/or image analysis and filter/action lookup and of selective rendering, execution begins at step 110 for a determination as to whether or not the parsed data is image data or text data. If it is determined at decision block 110 that a particular parsed data is image data, the image data is then sent to an image analysis process. At step 112, the image data is decomposed into one or more regions. At step 114 the one or more regions are analyzed against an image filter database. Embodiments of the present invention allow for the analysis to be any form of an analysis/comparison process. A determination is then made at decision block 116 as to whether or not a match occurred. In one embodiment, the matching need not be an exact image match. For example, a match may be based on the amount of flesh tone and body location of a particular image.

With reference back to decision block 110, text data is sent to a text analysis process at step 118, where the text sequences are compared with text sequences from a text filter database at step 120. A determination is then made at decision block 116 as to whether or not a match occurred. Embodiments of the present invention allow for any form of matching. In one embodiment, matching does not require an exact keyword match. For example, a match may include a grammatically equivalent match or contain wildcard components.

If it is determined at decision block 116 that a match does not exist, execution proceeds directly to decision block 124. Alternatively, if it is determined at decision block 116 that one or more matches exist, the actions associated with the matching text filters are sent back to the text analysis process at step 122 and a determination is then made at decision block 124 as to whether or not to render the print job.

Examples of such actions sent back at step 122 include rejecting the print job, requiring acknowledgement, removing at least a portion of the content, replacing at least a portion of the content, etc. Thus, for example, when rejecting the print job, the context filtering process instructs the print subsystem component to cancel the print job and notify the user. When requiring acknowledgement, the context filtering process prompts the user or instructs the print subsystem to prompt the user that the content may be inappropriate and to confirm printing. If the user confirms the printing thereof, the print subsystem continues as normal (e.g., prints the job). Alternatively, if the user does not confirm the printing, the context filtering process instructs the print subsystem component to cancel the print job and notify the user. When removing the content, the context filtering process removes the content from the print job or instructs the print subsystem to remove the content from the print job. When replacing the content, the context filtering process replaces the content with alternative content in the print job or instructs the print subsystem to replace the content with alternative content in the print job.

With reference back to decision block 124, if it is determined that the print job is to be rendered, execution proceeds to step 126, where the print job is selectively rendered as discussed herein. Alternatively, if it is determined at decision block 124 that the print job is not to be rendered, execution proceeds to step 128, where the print job is not rendered and a termination message is provided.

Figure 6:
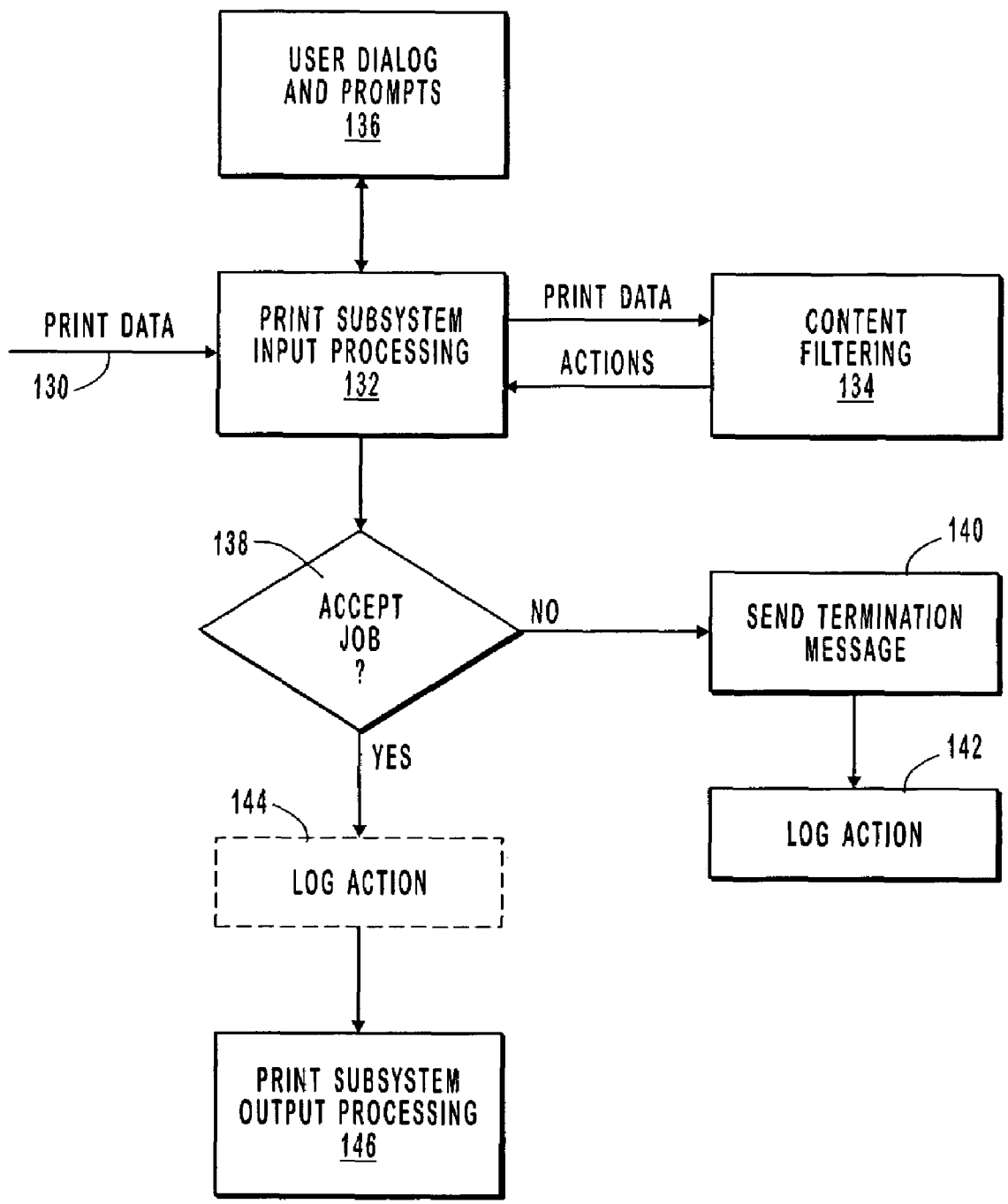
FIG. 6 illustrates a representative association between content filtering and a print subsystem used to selectively render a print job.

With reference now to FIG. 6, a representative embodiment is provided that illustrates a representative association between content filtering and a print subsystem used to selectively render a print job. In FIG. 6, print data 130 is provided to a print subsystem input processing 132. The print subsystem input processing provides print data to a content filtering process 134 through the use of a print processor, spooler, print assist, port manager or another component of the print subsystem. Actions are selectively returned to the print subsystem input processing 132 from the content filtering process 134. The print subsystem input processing 132 selectively interfaces with a user dialog and prompts 136. A determination is made at decision block 138 as to whether or not to accept the print job for rendering. If the print job is not to be accepted, a termination message is provided at step 140 and the action is logged at step 142. Alternatively, if the print job is accepted, the action is optionally logged at step 144 and then is provided to the print subsystem output processing 146 to selectively render the print job.

While embodiments of the present invention embrace the spooling and despooling subsystems of Microsoft Windows® operating systems, other embodiments include the spooling and despooling subsystems of Apple® Macintosh operating systems, Linux® operating systems, System V Unix® operating systems, BSD Unix® operating systems, OSF Unix® operating systems, IBM® Mainframe MVS operating systems, IBM AS/400, etc. Further, some embodiments embrace implementation by a port manager and incorporated as a content filtering printing protocol. Moreover, some embodiments embrace application to a client and/or server based fax and/or scan operation.

Thus, as discussed herein, embodiments of the present invention embrace filtering electronic content. In particular, the present invention relates to systems and methods for using a print subsystem to implement an analysis of the content of a print job prior to despooling the print job to a printing device, and selectively rendering, providing a modified rendering or terminating the print job. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a printing environment, a method for selectively filtering content of a print job, the method comprising:
   receiving a print request at a print subsystem to process a print job;
   providing print data from a component of the print subsystem to a content filtering process;
   segmenting the print job into one or more categories, including determining whether the print data includes raster data, wherein if the print data includes raster data, segmenting the print job further includes:
      decomposing the raster data into segments of text and image only data;
      using an optical character recognition process to process the segments of text;
      maintaining information about a location in the print data where the segments originate; and
      selectively passing content information;
   performing a content analysis on each of the one or more categories to identify undesirable content;
   if undesirable content exists, returning one or more actions from the content filtering process; and
   selectively rendering the print job.

2. A method as recited in claim 1, wherein the component of the print subsystem is one of:
   (i) a print processor;
   (ii) a spooler;
   (iii) a print assist; and
   (iv) port manager.

3. A method as recited in claim 2, wherein the content filtering process is one of:
   (i) included within the component;
   (ii) external to the component but internal to a computer device that includes the print subsystem; and
   (iii) external to the computer device.

4. A method as recited in claim 1, wherein selectively rendering the print job comprises at least one of:
   (i) rejecting the print job;
   (ii) requiring user acknowledgement to render the print job;
   (iii) removing content from the print job;
   (iv) replacing content from the print job;
   (v) logging the actions; and
   (vi) rendering the print job.

5. A method as recited in claim 1, wherein performing a content analysis includes analyzing the text data.

6. A method as recited in claim 5, wherein analyzing the text data comprises:
   comparing text sequences of the text data with text sequences of a text filter database; and
   if a match of text sequences exists, returning one or more actions from the content filtering process includes returning the actions and one or more matching text filters to a text analysis process.

7. A method as recited in claim 1, wherein performing a content analysis includes analyzing the image data.

8. A method as recited in claim 7, wherein the analyzing the image data comprises:
   decomposing the image data into one or more regions;
   analyzing the one or more regions against an image filter database; and
   if a match exists between the one or more regions and image information in the image filter database, the returning one or more actions from the content filtering process includes returning the actions and one or more matching image filters to an image analysis process.

9. A method as recited in claim 1, wherein the content analysis is selectively programmable.

10. A computer readable medium storing computer program code means utilized to implement a method for selectively filtering content of a print job, wherein the computer program code means is comprised of executable code for implementing:
    receiving a print request at a print subsystem to process a print job;
    providing print data from a component of the print subsystem to a content filtering process;
    segmenting the print job into one or more categories, including determining whether the print data includes raster data, wherein if the print data includes raster data, segmenting the print job further includes:
       decomposing the raster data into segments of text and image only data;
       using an optical character recognition process to process the segments of text;
       maintaining information about a location in the print data where the segments originate; and
       selectively passing content information;
    performing a content analysis on each of the one or more categories to identify undesirable content;
    if undesirable content exists, returning one or more actions from the content filtering process; and
    selectively rendering the print job.

11. A computer readable medium as recited in claim 10, wherein the component of the print subsystem is one of:
    (i) a print processor;
    (ii) a spooler;
    (iii) a print assist; and
    (iv) port manager.

12. A computer readable medium as recited in claim 10, wherein selectively rendering the print job comprises at least one of:
    (i) rejecting the print job;
    (ii) requiring user acknowledgement to render the print job;
    (iii) removing content from the print job;
    (iv) replacing content from the print job;
    (v) logging the actions; and
    (vi) rendering the print job.

13. A computer readable medium as recited in claim 10, wherein performing a content analysis includes analyzing any text data and any image data, and wherein analyzing any text data and any image data comprises:
    if text data exists, comparing text sequences of the text data with text sequences of a text filter database;
    if a match of text sequences exists, returning one or more actions from the content filtering process includes returning the actions and one or more matching text filters to a text analysis process;

if image data exists, decomposing the image data into one or more regions and analyzing the one or more regions against an image filter database; and if a match exists between the one or more regions and image information in the image filter database, returning one or more actions from the content filtering process includes returning the actions and one or more matching image filters to an image analysis process.

14. In a printing environment, a method for selectively filtering content of a print job, the method comprising:

receiving a print request at a print subsystem to process a print job;

providing print data from a component of the print subsystem to a content filtering process;

segmenting the print job into one or more categories, including determining whether the print data includes page description language (PDL) data, wherein if the print data includes PDL data, segmenting the print job further includes:

using a PDL parser to separate the PDL data into text data and image data;

maintaining information about a location in the print data where the segments originate; and selectively passing content information;

performing a content analysis on each of the one or more categories to identify undesirable content;

if undesirable content exists, returning one or more actions from the content filtering process; and selectively rendering the print job.

15. A method as recited in claim 14, wherein the component of the print subsystem is one of:

(i) a print processor;
(ii) a spooler;
(iii) a print assist; and
(iv) port manager.

16. A method as recited in claim 15, wherein the content filtering process is one of:

(i) included within the component;
(ii) external to the component but internal to a computer device that includes the print subsystem; and
(iii) external to the computer device.

17. A method as recited in claim 14, wherein selectively rendering the print job comprises at least one of:

(i) rejecting the print job;
(ii) requiring user acknowledgement to render the print job;
(iii) removing content from the print job;
(iv) replacing content from the print job;
(v) logging the actions; and
(vi) rendering the print job.

18. A method as recited in claim 14, wherein performing a content analysis includes analyzing the text data.

19. A method as recited in claim 18, wherein analyzing the text data comprises:

comparing text sequences of the text data with text sequences of a text filter database; and if a match of text sequences exists, returning one or more actions from the content filtering process includes returning the actions and one or more matching text filters to a text analysis process.

20. A method as recited in claim 14, wherein performing a content analysis includes analyzing the image data.

21. A method as recited in claim 20, wherein analyzing the image data comprises:

decomposing the image data into one or more regions;
analyzing the one or more regions against an image filter database; and if a match exists between the one or more regions and image information in the image filter database, returning one or more actions from the content filtering process includes returning the actions and one or more matching image filters to an image analysis process.

22. A method as recited in claim 14, wherein the content analysis is selectively programmable.

23. A computer readable medium storing computer program code means utilized to implement a method for selectively filtering content of a print job, wherein the computer program code means is comprised of executable code for implementing:

receiving a print request at a print subsystem to process a print job;

providing print data from a component of the print subsystem to a content filtering process;

segmenting the print job into one or more categories, including determining whether the print data includes page description language (PDL) data, wherein if the print data includes PDL data, segmenting the print job further includes:

using a PDL parser to separate the PDL data into text data and image data;

maintaining information about a location in the print data where the segments originate; and selectively passing content information;

performing a content analysis on each of the one or more categories to identify undesirable content;

if undesirable content exists, returning one or more actions from the content filtering process; and selectively rendering the print job.

24. A computer readable medium as recited in claim 23, wherein the component of the print subsystem is one of:

(i) a print processor;
(ii) a spooler;
(iii) a print assist; and
(iv) port manager.

25. A computer readable medium as recited in claim 23, wherein selectively rendering the print job comprises at least one of:

(i) rejecting the print job;
(ii) requiring user acknowledgement to render the print job;
(iii) removing content from the print job;
(iv) replacing content from the print job;
(v) logging the actions; and
(vi) rendering the print job.

26. A computer readable medium as recited in claim 23, wherein performing a content analysis includes analyzing any text data and any image data, and wherein analyzing any text data and any image data comprises:

if text data exists, comparing text sequences of the text data with text sequences of a text filter database;

if a match of text sequences exists, returning one or more actions from the content filtering process includes returning the actions and one or more matching text filters to a text analysis process;

if image data exists, decomposing the image data into one or more regions and analyzing the one or more regions against an image filter database; and if a match exists between the one or more regions and image information in the image filter database, returning one or more actions from the content filtering process includes returning the actions and one or more matching image filters to an image analysis process.

* * * * *